United States Patent [19]

Asai et al.

[11] Patent Number: 4,547,393
[45] Date of Patent: Oct. 15, 1985

[54] METHOD FOR PREPARING A MAGNETIC RECORDING MEDIUM

[75] Inventors: Takamitsu Asai, Tokyo; Tatsuji Kitamoto; Goro Akashi, both of Kanagawa, all of Japan

[73] Assignee: Fuji Photo Film Co., Ltd., Kanagawa, Japan

[21] Appl. No.: 618,803

[22] Filed: Jun. 8, 1984

Related U.S. Application Data

[63] Continuation of Ser. No. 438,568, Nov. 2, 1982, abandoned.

[30] Foreign Application Priority Data

Nov. 2, 1981 [JP] Japan .................. 56-176260

[51] Int. Cl.⁴ ............................. H01F 10/02
[52] U.S. Cl. ........................ 427/48; 427/130
[58] Field of Search ................ 427/127–132, 427/48

[56] References Cited

FOREIGN PATENT DOCUMENTS 57-13051  3/1982  Japan .

Primary Examiner—Bernard D. Pianalto
Attorney, Agent, or Firm—Sughrue, Mion, Zinn, Macpeak, and Seas

[57] ABSTRACT

The present invention relates to an improved method for preparing a magnetic recording method having excellent magnetic orientation comprising the steps of (1) dispersing ferromagnetic fine particles which are plate-shaped and which have an axis of magnetization perpendicular to the plates of the particles in a binder and (2) coating a magnetic coating layer on a non-magnetic support wherein the method comprises, after coating the magnetic coating layer and before drying it, subjecting the surface of the magnetic layer to a magnetic field from the direction perpendicular to the support to produce a magnetic orientation while contacting the surface of the magnetic layer with a flexible smoothening sheet.

23 Claims, 2 Drawing Figures

METHOD FOR PREPARING A MAGNETIC RECORDING MEDIUM

This is a continuation, of application Ser. No. 438,568, filed Nov. 2nd, 1982, abandoned.

FIELD OF THE INVENTION

This invention relates to a method for preparing a magnetic recording medium, and more particularly to a method for preparing a magnetic recording medium having excellent magnetic orientation.

BACKGROUND OF THE INVENTION

A magnetic recording medium is conventionally prepared by coating a binder and a ferromagnetic material which is plate-shaped and which has an easy axis of magnetization that is perpendicular or vertical to the surface of the plate on a non-magnetic support. The ferromagnetic material can include barium ferrite, of which barium or iron can be partially substituted with a metal such as Ca, Sr, Pb, Co or Ni, or MnBi of which Mn or Bi can be substituted with a metal such as Se.

It is well known that after coating a magnetic coating composition and before drying the coating layer, magnetic particles are subjected to orientation in the magnetic field toward the recording direction to improve the electromagnetic characteristics in this direction. For example, this method has been employed for preparing a magnetic recording tape using an acicular $\gamma$-$Fe_2O_3$, as is disclosed in Japanese patent publication Nos. 5350/65, 23624/65, 23626/65, 2065/66 and 21251/68.

It is clear, however, that the orientation degree is markedly insufficient as evidenced when observating the orientation degree of the magnetic particles using an electromicroscope or X-ray diffraction.

Yasushi Hoshino, "New Science for Industrial Materials, Composite Materials IV" published by Kinbara Shuppan in 1969 on page 63 discloses that $CrO_2$ is more easily oriented than other ferromagnetic materials, but that even $CrO_2$ is incompletely oriented with high speed coating (not less than 20 m/sec.).

It is believed that the reason for incomplete magnetic orientation is the high thixotropic property of various magnetic coating materials.

It is disclosed in Japanese patent publication No. 856/81 that a magnetic layer is provided on a support and before the magnetic layer is dried, a flexible sheet is contacted with the surface of the magnetic layer while applying a magnetic field thereon to improve the degree of orientation.

Further, it is taught in "Nikkei Electronics", pages 100 to 111 (Aug. 7, 1978) and in IEEE Transactions on Magnetics" Vol. MAG-15, No. 6, pages 1561 to 1563 (November, 1979) that a perpendicular magnetic recording system is excellent in a high density magnetic recording system.

A method for smoothening an uneven surface containing pin-holes, longitudinal lines or streaks, irregular coating thickness, etc. by contacting the flexible sheet (hereinafter "sheet") with the surface of the not yet dried or solidified coating layer, is employed in the industry for coating highly viscous solutions as disclosed in Japanese patent publication No. 96469/72 and 53631/74.

In employing this smoothening method to prepare magnetic recording tapes, the inventors of the present invention have found that the orientation of the magnetic particles is markedly improved by applying magnetic field to produce a magnetic orientation at the smoothening area. It has been also found that the orientation of magnetic particles is greater than in any instances where only the magnetic orientation is conducted, where the smoothening method is applied after magnetic orientation is conducted, where magnetic orientation is conducted after the smoothening method is applied, and where only the smoothening method is applied and magnetic orientation is not conducted.

The present invention is more effective because, when the smoothening method is carried out, a stronger shearing force is applied parallel to the surface of the undried coating layer and the coating layer becomes markedly fluid which results in temporarily lowering thixotropy of the coating solution on the web.

The present invention is an improvement of the method as disclosed in Japanese patent publication No. 856/81 in which a plate-shaped magnetic material having magnetic anisotropy perpendicular to the plate is employed, an easy axis of magnetization is subjected to orientation perpendicular to a surface of a support and perpendicular to the magnetic component is used to prepare a magnetic recording medium suitable for a magnetic recording system.

SUMMARY OF THE INVENTION

An object of the present invention is to provide a method for preparing a magnetic recording medium having a high degree to perpendicular orientation.

Another object of the present invention is to provide a novel method for coating a magnetic coating composition.

A further object of the present invention is to provide a magnetic recording medium which has excellent high output (particularly high output in the high wave length region), high S/N ratio and high frequency characteristics, i.e., a constant output level over a wide frequency range.

A still another object of the present invention is to provide a magnetic recording tape having a very smooth surface.

The present invention relates to a method for preparing a magnetic recording medium which comprises providing, on a support, a magnetic coating layer comprising a binder and a plate-shaped ferromagnetic material having anisotropy perpendicular to the plate, contacting a flexible sheet with a surface of the coating layer before the coating layer is dried, and subjecting the coating layer to a magnetic field to produce the magnetic orientation.

BRIEF DESCRIPTION OF THE DRAWINGS

In FIGS. 1 and 2, numeral 1 is a web, numeral 2 is a coating layer, numeral 3 is a backing roll, numeral 4 is a smoothening sheet, numeral 5 is a pedestal for fixing a smoothening sheet, numerals 6 and 6' are solenoids, numeral 11 is a smoothening sheet, numeral 12 is a roll for a sheet fixing pedestal, numeral 13 is a fixing metal and numerals 14 and 15 are a pair of magnets.

DETAILED DESCRIPTION OF THE INVENTION

The present invention is further explained in more detail with accompanying drawings.

Coating layer 2 is coated on a surface of web 1 by a conventional coating method. Web 1 having coated thereon coating layer 2 in the undried and unsolidified condition is travelled toward the direction of the arrow from the left-bottom side of FIG. 1, then passed on backing roll 3. Finally, sheet 4 is contacted with the surface of coating layer 2 on the way to the upper left side where the smoothening step is carried out.

Figure 1:
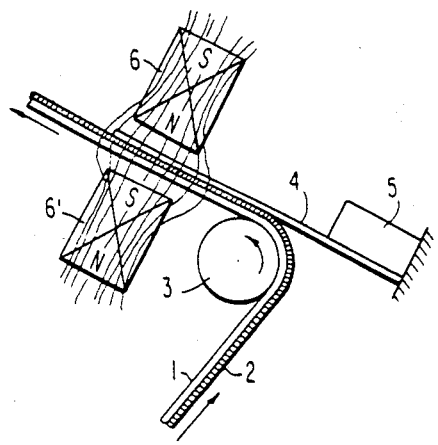
FIGS. 1 and 2 are a cross-sectional views of the method of the invention.

In the meanwhile, a magnetic field is applied at the smoothening area perpendicular to sheet 4 by solenoids 6 and 6'. The solenoids can be substituted by permanent magnets, i.e., the magnetic field can be applied perpendicular to sheet 4 between two magnets. (Cross-sectional views of solenoid coils 6 and 6' are shown in FIG. 1.) Longitudinal lines or streaks formed on sheet 4 can be prevented by moving the position of fixing pedestal 5. If the longitudinal lines or streaks can not be completely prevented, another means can be provided to prevent them wherein another sheet is fixed at the opposite side of the support to buttress the support as disclosed in Japanese patent application No. 61124/73 (Japanese patent publication No. 10337/75).

In FIG. 1, the magnetic field is applied only to the smoothening area. However, the field can be applied additionally to other areas which are not smoothened.

Figure 2:
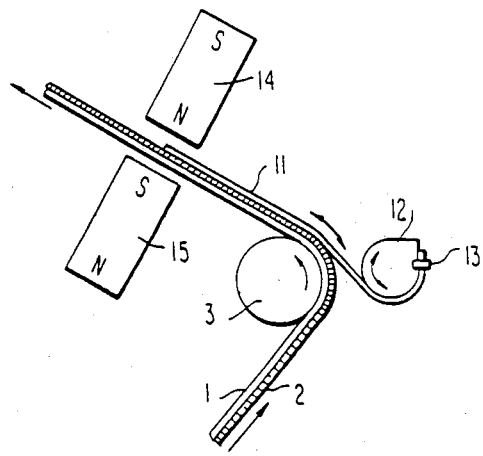

FIG. 2 is a cross-sectional view showing another embodiment of this invention.

The contact area of the sheet at the smoothening area can be adjusted by turning roll 12 in the direction of the arrow shown in FIG. 2. Longitudinal lines or streaks occuring on a sheet can be prevented by adjusting the contact area.

The prevention of longitudinal lines or streaks results in the prevention of air coming between a smoothening sheet and the surface of the coating layer.

The magnetic field for magnetic orientation is applied by a pair of magnets 14 and 15 on part of the smoothening area. Magnets 14 and 15 are set so that opposite magnetic poles meet, as shown in FIG. 2. In this manner, magnetic particles contained in the magnetic coating layer can be oriented in a predetermined direction.

The web of the present invention conventionally includes films such as polyethylene terephthalate, polyvinyl chloride or cellulose acetate.

The thickness of the flexible sheet is from about 4 microns to 120 microns. The material for the sheet includes a polyester film comprising polyethylene terephthalate; a cellulose derivative film comprising cellulose triacetate and cellulose diacetate; a polycarbonate film, a polyimide film; a polyolefin film comprising of polyethylene, polypropylene; a polyvinyl chloride film and a polyvinylidene chloride film.

The web speed is between 5 m/min to 380 m/min.

The strength of the magnetic field on the surface of a coating layer is between 50 gauss to 5000 gauss.

The contact length with the sheet and the web in the traveling direction of the web is between 10 to 500 mm.

Particularly excellent results are obtained when the end of the smoothening sheet is positioned vertical to the magnetic field.

Magnetic particles which can be used for the magnetic coating composition are selected from the group consisting of:

(a) Ferrite represented by the general formula: $AFe_{12}O_{19}$ wherein A is at least one member selected from the group consisting of Ba, Sr, Pb and Ca.

(b) Ferrite represented by the general formula: $A'Fe_{12-x}M_xO_{19}$ wherein A' is at least one member selected from the group consisting of Ba, Sr, and Pb, and wherein M is at least one member selected from the group consisting of In, $\frac{1}{2}Zn+\frac{1}{2}Ge$, $\frac{1}{2}Zn+\frac{1}{2}Nb$, $\frac{1}{2}Zn+\frac{1}{2}V$, $\frac{1}{2}Co+\frac{1}{2}Ti$ and $\frac{1}{2}Co+\frac{1}{2}Ge$, and wherein x is less than or equal to 2.2 and greater than or equal to 1.0.

(c) Ferrite represented by the general formula: $A''M'_2Fe_{16}O_{27}$ wherein A'' is at least one member selected from the group consisting of Ba, Sr, Ca and Pb, and wherein M' is at least one member selected from the group consisting of Zn, Ni, Cu, Fe and Mn.

(d) Ferrite represented by the general formula: $A'''Fe_{12-2y}Co_yM''_yO_{19}$ wherein A''' is one member selected from the group consisting of Ba, Sr, Pb and Co, and wherein M'' is at least one member selected from the group consisting of Ti, Ge, $\frac{1}{2}Ti+\frac{1}{2}Ge$ and wherein y is greater than or equal to 0.5 and less than or equal to 1.1.

(e) Plate-shaped magnetic particles such as a hexacrystal cobalt alloy or MnBi.

The size of the magnetic particles ranges between a maximum length of 80 Å to 10 microns.

Examples of binders used in the present invention include conventionally known thermoplastic resins, thermosetting resins, reactive resins and mixture thereof.

Thermoplastic resins used in the present invention have a softening point of not higher than 150° C., an average molecular weight of 10,000 to 200,000 and a degree of polymerization of about 400 to about 500. Examples of such resins include a copolymer of vinyl chloride and vinyl acetate, a copolymer of vinyl chloride and vinylidene chloride, a copolymer of vinyl chloride and acrylonitrile, a copolymer of acrylic ester and acrylonitrile, a copolymer of acrylic ester and vinylidene chloride, a copolymer of acrylic ester and styrene, a copolymer of methacrylic ester and acrylonitrile, a copolymer of methacrylic ester and vinylidene chloride, a copolymer of methacrylic ester and styrene, urethane elastomer, nylon-silicone type resin, nitrocellulosepolyamide resin, polyfluorovinyl, a copolymer of vinylidene chloride and acrylonitrile, a copolymer of butadiene and acrylonitrile, polyamide resin, polyvinylbutyral, cellulose derivatives such as cellulose acetate butyrate, cellulose diacetate, cellulose triacetate, cellulose propionate, nitrocellulose and the like, a copolymer of styrene and butadiene, a polyester resin, a copolymer of chlorovinyl ester and acrylic ester, an amino resin, various synthetic rubber type thermoplastic resins and the mixture thereof. Examples of these resins are disclosed in Japanese patent publication Nos. 6877/62, 12528/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72 and 27886/72.

Thermosetting resins or reactive resins used in the present invention have a molecular weight of not higher than 200,000 in the coating solution state. When these resins are coated, dried and heated, they have an infinite molecular weight because of the condensation and addition reaction. It is preferred that these resins are not softened nor melted until they are heat-decomposed. Specifically these resins include phenol resins, epoxy resins, polyurethane setting type resins, urea resins, melamine resins, alkyd resins, silicone resins, acryl reactive resins, epoxy polyamide resins, nitrocellulose melamine resins, a mixture of high molecular weight polyester resins and isocyanate prepolymer, a mixture of a copolymer of methacrylate and diisocyanate prepolymer, a mixture of polyester polyol and polyisocyanate, urea-formaldehyde resins, a mixture of low molecular weight glycol/high molecular weight diol/triphenylmethane triisocyanate, polyamine resins, and the mixture thereof. These resins are disclosed in Japanese patent publication Nos. 8103/64, 9779/65, 7192/66, 8016/66, 14275/66, 18179/67, 12081/68, 28023/69, 14501/70, 24902/70, 13103/71, 22065/72, 22066/72, 22067/72, 22072/72, 22073/72, 28045/72, 28048/72 and 28922/72.

In the present invention, these binders can be used alone or in combination, and additive agents can be added thereto.

Ferromagnetic powders and binders are mixed in such a mixing ratio (part by weight) that 10 to 200 parts by weight of binders are added to 100 parts by weight of ferromagnetic powders.

Examples of additives that can be used in the present invention include dispersing agents, lubricants and abrasives.

Examples of dispersing agents include fatty acids having 12 to 18 carbon atoms and esters thereof ($R_1COOR$, wherein R is hydrogen or an alkyl group having 1 to 21 carbon atoms and $R_1$ is an alkyl group having 11 to 17 carbon atoms) such as caprylic acid, capric acid, lauric acid, myristic acid, palmitic acid, stearic acid, oleic acid, elaidic acid, linoleic acid and stearolic acid; acid ester resins ($R_3COOR_4$, wherein $R_3$ and $R_4$ each represents an alkyl group having 1 to 12 carbon atoms) such as ethyl acetate, butyl acetate, ethyl propionate, methyl butyrate, ethyl caprylate, and propyl laurate; metallic soaps composed of alkali metal (Li, Na, K, etc.) or of alkaline earth metal (Mg, Ca, Ra, etc.) of abovementioned fatty acids; and lecithin. Additionally, higher alcohol having not less than 12 carbon atoms and sulfate thereof can be used. 1 to 20 parts by weight of dispersing agents are added to 100 parts by weight of binders.

Examples of lubricants include silicone oil, graphite, molybdenum disulfide, tungsten disulfide, esters of fatty acid comprising a monobasic fatty acid having 12 to 16 carbon atoms and a monohydric alcohol having 3 to 12 carbon atoms, and esters of fatty acid comprising a monobasic fatty acid having not less than 17 carbon atoms and a monhydric alcohol having 21 to 23 carbon atoms including carbon atoms of the above-described mono-basic fatty acids. Further, examples of lubricants are disclosed in Japanese patent publication No. 23889/68, Japanese patent application Nos. 28647/67 (Japanese patent publication No. 24041/73) and 81543/68 (Japanese patent publication No. 18482/73).

0.2 to 20 parts by weight of lubricants are added to 100 parts by weight of binders.

Examples of abrasives used in the present invention include fused alumina, silicon carbide, chromium oxide, corundum, artificial corundum, diamond, artificial diamond, garnet, emery (main component, corundum and magnetite). These abrasives have an average particle diameter of 0.05 to $5\mu$ and preferably of 0.1 to $2\mu$. 7 to 20 parts by weight of abrasives are added to 100 parts by weight of binders. Such abrasives are disclosed in Japanese patent application No. 26749/73 (Japanese patent publication No. 28642/77).

The above composition is dissolved by an organic solvent and is coated on a support to obtain a magnetic recording layer.

Organic solvents used in the present invention include ketones such as acetone, methyl ethyl ketone, methyl isobutyl ketone and cyclohexane ketone; alcohols such as methanol, ethanol, propanol and buthanol, esters such as methyl acetate, ethyl acetate, butyl acetate, ethyl lactate, glycol acetate and monoethyl ether; glycol ethers such as ether, glycol dimethyl ether, glycol monoethyl ether and dioxane; tars (aromatic hydrocarbons) such as benzene, toluene and xylene; and chlorinated hydrocarbons such as methylene chloride, ethylene chloride, carbon tetrachloride, chloroform, ethylene chlorohydrin and dichlorobenzene.

A support used in the present invention has a thickness of 5 to $50\mu$ and preferably of 10 to $40\mu$, and examples of materials are polyesters such as polyethylene terephthalate, polyolefins such as polypropylene, cellulose derivatives such as cellulose triacetate and cellulose diacetate and polycarbonate.

Method for coating the above-mentioned magnetic recording layer, includes air doctor coating, plate coating, air knife coating, squeeze coating, impregnating coating, reverse roll coating, transfer roll coating, gravure coating, kiss coating, cast coating and spray coating. Detailed explanations are disclosed in "Coating Engineering" published by Asakura Shoten, on pages 253 to 277 (published on Mar. 1, 1972).

The present invention will be explained in more detail by the following example. Materials, quantities and volumes can be changed by those skilled in this art so long as the gist of the present invention is not essentially changed. Accordingly, the scope of the invention should not be limited to the Example. In the Example, "part" (mixing ratio) means "part by weight".

EXAMPLE

| | |
|---|---|
| Ba Ferrite Substituted with Co (average particle size: 0.1 micron, average thickness of plate-shaped particle: 0.03 micron, coersive force: 1320 oersted) | 300 parts |
| Graphite Powder (average particle size: about 5 microns) | 15 parts |
| Copolymer of Vinyl Chloride and Vinylidene Chloride (copolymerization ratio, 80:20, molecular weight: 45,000 | 45 parts |
| Amyl stearate | 10 parts |
| Silicone Oil | 4 parts |
| Lecithin | 3 parts |
| Methyl Ethyl Ketone | 300 parts |
| Toluene | 300 parts |

The above composition was mixed and dispersed in a ball mill, 50 parts of polyester polyol were added thereto and after mixed homogeneously, 30 parts of polyisocyanate were added, mixed and dispersed to obtain a hardenable magnetic coating composition.

The above coating composition was coated on a polyethylene terephthalate film having a thickness of 25 microns which had been subjected to a corona discharge by a gravure roll with a dry thickness of 8 microns. The coating speed was 50 m/min.

Treatments shown in Table 1 were provided on the surface of the coating layer which was not dried nor solidified.

TABLE I

| Sample No. | Treatment |
|---|---|
| 1 | The surface was dried without any treatment. (control) |
| 2 | The surface was subjected to magnetic orientation at 2000 gauss and dried. |
| 3 | The surface was smoothened and dried. |
| 4 | The surface was smoothened, subjected to magnetic orientation at 2000 gauss and dried. |
| 5 | The surface was subjected to magnetic orientation at 2000 gauss, smoothened and dried. |
| 6 (Present Invention) | Magnetic field was applied at 2000 gauss on a smoothened area to effect magnetic orientation and the surface was dried. At the end of a smoothening sheet, magnetic field was applied at 1600 gauss. |

Magnetic orientation was conducted by a pair of permanent magnets which were placed confronting the opposite poles each other. The direction of orientation was perpendicular to a web surface.

Smoothening was conducted by contacting a polyethylene terephthalate film having a thickness of 25 microns with a web in a travelling direction at a distance of 18 cm.

The resulting magnetic tape having a wide width was subjected to a super-calender and slit to provide a magnetic tape. Test results of the samples are shown in Table 2.

TABLE 2

| Sample No. | Shape of Surface | Squareness Ratio (Br/Bm) | Output of Recorded Wave Length 1 micron (dB) |
|---|---|---|---|
| 1 | Gravure pattern is present. | 0.59 | 0.0 |
| 2 | Gravure pattern is present. | 0.65 | +1.0 |
| 3 | Smooth surface | 0.61 | +0.5 |
| 4 | Smooth surface | 0.67 | +1.5 |
| 5 | Smooth surface | 0.71 | +1.7 |
| 6 | Smooth surface | 0.75 | +3.5 |

As is apparent from the above table, Sample No. 6, i.e., the present invention, has a smooth surface and high output.

In the present invention a plate-shaped alloy powder such as MnBi was particularly useful in improving the degree of orientation.

In one preferred embodiment, the magnetic field is at 50 to 5000 gauss. In another preferred embodiment, the flexible sheet has a thickness of about 4 microns to about 120 microns.

While the invention has been described in detail and with reference to specific embodiment thereof, it will be apparent to one skilled in the art that various changes and modifications can be made therein without departing from the spirit and scope thereof.

What is claimed is:

1. A method for preparing a magnetic recording medium comprising the steps of
   (1) dispersing in a binder ferromagnetic fine particles which are plate-shaped and which have an axis of easy magnetization perpendicular to the plate of the particles in a binder and
   (2) coating a magnetic coating layer on a non-magnetic support,
   wherein the method includes, after coating the magnetic coating layer and before drying it, subjecting the surface of the magnetic layer to a magnetic filed from the direction perpendicular to the support to produce a magnetic orientation while contacting the surface of the magnetic coating layer with a flexible smoothening sheet, and
   wherein the ferromagnetic fine particles are selected from the group consisting of $AFe_{12}O_{19}$, wherein A is at least one member selected from the group consisting of Ba, Sr, Pb and Ca; $A'Fe_{12-x}M_xO_{19}$, wherein A' is at least one member selected from the group consisting of In, $\frac{1}{2}Zn+\frac{1}{2}Ge$, $\frac{1}{2}Zn+\frac{1}{2}Nb$, $\frac{1}{2}Zn+\frac{1}{2}V$, $\frac{1}{2}Co+\frac{1}{2}Ti$ and $\frac{1}{2}Co+\frac{1}{2}Ge$ and wherein x is greater than or equal to 1.0 and less than or equal to 2.2; group consisting of Ba, Sr, Ca and Pb and wherein M is at least one member selected from the group consisting of Zn, Ni, Cu, Fe and Mn; $A'''Fe_{12-2y}Co_yM''_yO_{19}$ wherein $A'''$ is at least one member selected from the group consisting of Ba, Sr, Pb and Co and wherein M" is selected from at least one member of the group consisting of Ti, Ge, $\frac{1}{2}Ti+\frac{1}{2}Ge$ and wherein y is greater than or equal to 0.5 and less than or equal to 1.1; and a hexacrystal cobalt alloy and MnBi.

2. A method for preparing a magnetic recording medium as in claim 1, wherein the flexible smoothing sheet is positioned vertical to the magnetic field.

3. A method for preparing a magnetic recording medium as in claim 1, wherein the ferromagnetic fine particles have a maximum length of 80 Å to 10 microns.

4. A method for preparing a magnetic recording medium as in claim 1, wherein the binder is selected from at least one member of the group consisting of thermoplastic resins, thermosetting resins and reactive resins.

5. A method for preparing a magnetic recording medium as in claim 4, wherein the thermoplastic resins have a softening point of not higher than 150° C., an average molecular weight of 10,000 to 200,000 and a degree of polymerization of about 400 to 500.

6. A method for preparing a magnetic recording medium as in claim 4, wherein the thermosetting resins and reactive resins have a molecular weight of not higher than 200,000 in the coating solution state.

7. A method for preparing a magnetic recording medium as in claim 6, wherein the thermosetting resins and reactive resins are not softened or melted until they are heat-decomposed.

8. A method for preparing a magnetic recording medium as in claim 1, wherein 10 to 200 parts by weight of binders are added to 100 parts by weight of ferromagnetic powders.

9. A method for preparing a magnetic recording medium as in claim 4, wherein the binder is used in combination with additive agents.

10. A method for preparing a magnetic recording medium as in claim 9, wherein the additive agents are selected from at least one member of the group consisting of dispersing agents, lubricants and abrasives.

11. A method for preparing a magnetic recording medium as in claim 10, wherein 1 to 20 parts by weight of dispersing agent is added to 100 parts by weight of binder.

12. A method for preparing a magnetic recording medium as in claim 10, wherein 0.2 to 20 parts by weight to lubricants are added to 100 parts by weight of binder.

13. A method for preparing a magnetic recording medium as in claim 10, wherein the abrasives have an average particle diameter of 0.05 to 5 microns.

14. A method for preparing a magnetic recording medium as in claim 10, wherein the abrasives have an average particle diameter of 0.1 to 2 microns.

15. A method for preparing a magnetic recording medium as in claim 10, wherein 7 to 20 parts by weight of abrasives are added to 100 parts by weight of binder.

16. A method for preparing a magnetic recording medium as in claim 1, wherein the magnetic coating layer comprises ferromagnetic fine particles, binder and an organic solvent.

17. A method for preparing a magnetic recording medium as in claim 1, wherein the non-magnetic support has a thickness of 5 to 50 microns.

18. A method for preparing a magnetic recording medium as in claim 1, wherein the non-magnetic support has a thickness of 10 to 40 microns.

19. A method for preparing a magnetic recording medium as in claim 1, wherein the non-magnetic support is selected from the group consisting of polyesters, polyolefins, and cellulose derivatives.

20. A method for preparing a magnetic recording medium as in claim 19, wherein the polyester is polyethylene terephthalate.

21. A method for preparing a magnetic recording medium as in claim 19, wherein the polyolefin is polypropylene.

22. A method for preparing a magnetic recording medium as in claim 1, wherein the magnetic field is 50 to 5000 gauss.

23. A method for preparing a magnetic recording medium as in claim 1, wherein the flexible smoothing sheet has a thickness of 4 microns to 120 microns.

* * * * *